A. J. TEWKSBURY.
Device for Registering the Number of Shoes Soled by a Sewing Machine.
No. 50,642. Patented Oct. 24, 1865.
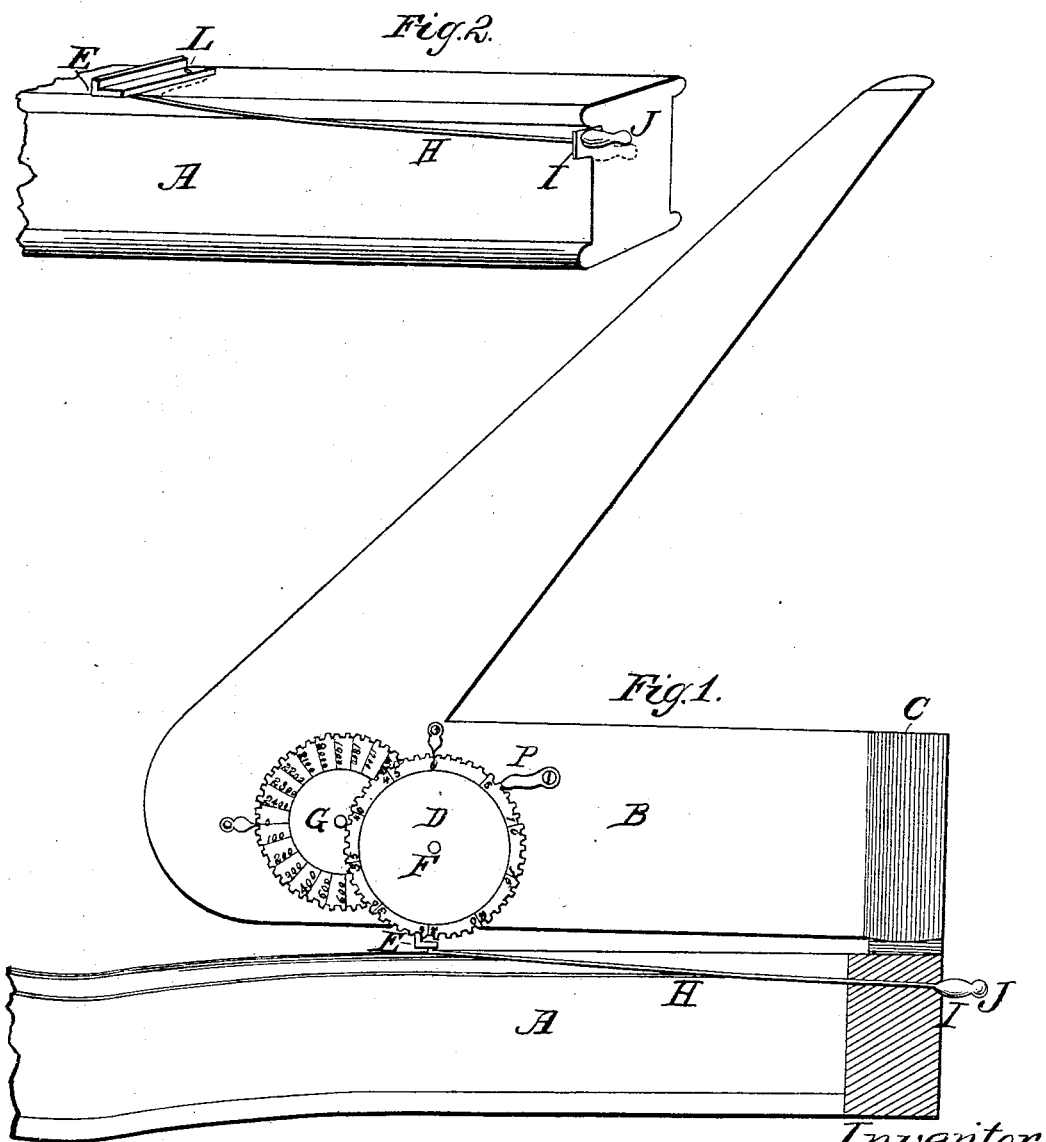
Witnesses.
N. Stafford
Wm. G. Blunt
Inventor
A. J. Tewksbury

UNITED STATES PATENT OFFICE.

A. J. TEWKSBURY, OF HAVERHILL, MASSACHUSETTS.

DEVICE FOR REGISTERING THE NUMBER OF SHOES SOLED BY A SEWING-MACHINE.

Specification forming part of Letters Patent No. 50,642, dated October 24, 1865; antedated October 4, 1865.

*To all whom it may concern:*

Be it known that I, A. J. TEWKSBURY, of Haverhill, in the county of Essex and State of Massachusetts, have invented a new and useful Improvement in the Shoe-Sole-Stitching Machine patented by Gordon McKay and R. H. Mathies, August 12, 1852, (No. 36,163,) whereby said machine is made to register the number of shoes stitched thereon; and I do hereby declare that the following is a full, clear, and exact description of the same, reference being had to the annexed drawings, making a part of this specification, in which—

Figure 1 represents the rotating horn of the McKay sewing-machine, together with a portion of the rear part of the frame-work immediately over which the horn passes in its revolutions about the center C, A being the portion of the frame-work, and B the rotating horn, the inclined or upper portion on which the shoe is placed being shown only in outline. Fig. 2 is a perspective view of a portion of the frame-work A, showing a swing-catch, E, operating in connection with a rod, H, knob J, and catch I.

A wheel, D, of fifty teeth, Fig. 1, is so placed upon the lower or horizontal portion of the rotating horn B that the teeth shall come in contact with swing-catch E as the horn revolves past frame-work A, to which swing-catch E is confined at such an angle that toothed wheel D, coming in contact with and moving past it, is made to rotate one tooth. Consequently wheel D will make one revolution for every fifty revolutions of horn B, and as the horn revolves once for every shoe stitched thereon, one revolution of wheel D will indicate that fifty shoes have been stitched, a less number being shown by the teeth which have passed the index, as shown by the figures on said wheel D. Another wheel, G, of fifty teeth, is so placed in connection with wheel D that a pin, F, projecting through upon the inside of wheel D, near the center of the same, will rotate said wheel G one tooth for every revolution of wheel D. Therefore one revolution of wheel G will indicate fifty revolutions of wheel D or twenty-five hundred revolutions of horn B, thus showing that twenty-five hundred shoes have been stitched, a less number being indicated by the figures on said wheel G.

Swing-catch E, Fig. 2, has sufficient motion about the center L to allow of its being brought to a position at right angles to frame-work A, so that wheel D, in moving past it, receives no impulse therefrom. Consequently, when it is desired to throw the registering device out of gear, knob J is drawn through catch I, a slot in catch I allowing rod H and knob J to drop into the position shown by dotted lines, thus confining swing-catch E in a position at right angles to frame-work A, thus allowing horn B to rotate in either direction without communicating motion to wheel D. On releasing knob J a spring underneath swing-catch E throws it back again to the position shown in the drawing.

Should it be necessary to rotate the horn B from right to left, the yielding nature of swing-catch E allows wheel D to pass in this direction without unregistering, as snap P, Fig. 1, prevents wheel D from turning back.

What I claim as my invention, and desire to secure by Letters Patent, is—

1. A device for indicating the number of shoes stitched on shoe-sole-stitching machines, composed of one or more wheels or their equivalents, operated by the motion of the rotating horn on which the shoe is stitched.

2. Swing-catch E or its equivalent, operating as described, and for the purpose specified.

A. J. TEWKSBURY.

Witnesses:
 N. SPOFFORD,
 CHAS. J. NOYES.